(12) United States Patent
Wilson et al.

(10) Patent No.: US 10,654,330 B2
(45) Date of Patent: May 19, 2020

(54) SUSPENSION BRACKET FOR A UTILITY VEHICLE

(71) Applicant: Ingersoll-Rand Company, Davidson, NC (US)

(72) Inventors: Bryan D. Wilson, Evans, GA (US); William Leiter, Evans, GA (US); Craig D. Pugh, Augusta, GA (US); Joseph B. Kachman, Evans, GA (US)

(73) Assignee: Club Car, LLC, Evans, GA (US)

( * ) Notice: Subject to any disclaimer, the term of this patent is extended or adjusted under 35 U.S.C. 154(b) by 116 days.

(21) Appl. No.: 15/856,882

(22) Filed: Dec. 28, 2017

(65) Prior Publication Data

US 2018/0186205 A1 Jul. 5, 2018

Related U.S. Application Data (60) Provisional application No. 62/440,637, filed on Dec. 30, 2016, provisional application No. 62/440,642, filed on Dec. 30, 2016.

(51) Int. Cl.
*B60G 11/10* (2006.01)
*B60G 11/04* (2006.01)
*B60G 11/113* (2006.01)

(52) U.S. Cl.
CPC .............. *B60G 11/10* (2013.01); *B60G 11/04* (2013.01); *B60G 11/113* (2013.01); *B60G 2204/43* (2013.01); *B60G 2204/4502* (2013.01); *B60G 2206/50* (2013.01); *B60G 2206/811* (2013.01); *B60G 2206/8102* (2013.01); *B60G 2300/13* (2013.01); *B60G 2300/26* (2013.01)

(58) Field of Classification Search
CPC ..... B60G 11/10; B60G 11/113; B60G 21/005; B60G 11/04; B60G 9/003; B60G 2204/4502; B60G 2206/8102; B60G 2204/43; B60G 2300/13
See application file for complete search history.

(56) References Cited

U.S. PATENT DOCUMENTS

| | | | | |
|---|---|---|---|---|
| 3,567,243 | A * | 3/1971 | Ruhlin | B60G 3/01 280/86.757 |
| 6,206,407 | B1 * | 3/2001 | Fuchs | B60G 5/00 280/124.174 |
| 6,364,333 | B1 * | 4/2002 | Atkinson | B60G 3/10 267/52 |
| 7,520,515 | B2 * | 4/2009 | Richardson | B60G 7/006 280/124.116 |

(Continued)

FOREIGN PATENT DOCUMENTS

WO WO-2010132692 A1 * 11/2010 ............. B60G 9/022

*Primary Examiner* — Karen Beck
(74) *Attorney, Agent, or Firm* — Taft Stettinius & Hollister LLP (57) ABSTRACT

A utility cart includes a suspension having an integral suspension bracket having an attachment point for a lateral suspension link, holes through which U-bolts are passed to secure an axle of the utility cart to the bracket, and can include an opening into which a spring pin (e.g. a pin of a leaf spring) can be inserted. The suspension bracket can alternatively include a brake cable attachment feature. The suspension bracket can be cut from sheet stock of material, and stamped into final or near final form. In one embodiment a threaded nut can be attached to the attachment point for the lateral suspension link.

15 Claims, 9 Drawing Sheets

(56) References Cited

U.S. PATENT DOCUMENTS

| | | | | |
|---|---|---|---|---|
| 2001/0030406 A1* | 10/2001 | Pierce | .................... | B60G 9/003 |
| | | | | 280/124.116 |
| 2003/0163911 A1* | 9/2003 | Bigsby | .................... | B60G 9/00 |
| | | | | 29/525.01 |
| 2005/0253351 A1* | 11/2005 | Pan | ........................ | B60G 9/003 |
| | | | | 280/124.116 |
| 2006/0103103 A1* | 5/2006 | Land | ........................ | B60G 7/02 |
| | | | | 280/124.163 |
| 2006/0244236 A1* | 11/2006 | Cortez | ................... | B60G 11/113 |
| | | | | 280/124.175 |
| 2007/0267839 A1* | 11/2007 | Furman | ................. | B60G 9/003 |
| | | | | 280/124.147 |
| 2008/0084047 A1* | 4/2008 | Bluff | ....................... | B60G 7/02 |
| | | | | 280/423.1 |
| 2012/0153591 A1* | 6/2012 | Smith | ................... | B60G 11/10 |
| | | | | 280/124.107 |
| 2012/0217714 A1* | 8/2012 | Kiselis | ................... | B60G 7/001 |
| | | | | 280/124.116 |
| 2014/0077472 A1* | 3/2014 | Piehl | .................... | B60G 11/27 |
| | | | | 280/124.116 |
| 2014/0117176 A1* | 5/2014 | Pierce | .................... | F16M 13/02 |
| | | | | 248/205.1 |
| 2014/0138929 A1* | 5/2014 | Wilson | ................. | B60G 11/113 |
| | | | | 280/124.11 |
| 2014/0265205 A1* | 9/2014 | Dudding | ................. | B60G 9/02 |
| | | | | 280/124.116 |
| 2018/0186206 A1* | 7/2018 | Wilson | ................... | B60G 11/10 |
| 2018/0272819 A1* | 9/2018 | Galla | .................... | B60G 9/003 |
| 2019/0092407 A1* | 3/2019 | Jacobsma | .............. | B60G 11/28 |

* cited by examiner

SUSPENSION BRACKET FOR A UTILITY VEHICLE

TECHNICAL FIELD

The present invention generally relates to suspension components of a vehicle, and more particularly, but not exclusively, to an integral suspension bracket of a golf cart or other utility vehicle.

BACKGROUND

Providing integral suspension brackets for vehicles remains an area of interest. Some existing systems have various shortcomings relative to certain applications. Accordingly, there remains a need for further contributions in this area of technology.

SUMMARY

One embodiment of the present invention is a unique suspension bracket. Other embodiments include apparatuses, systems, devices, hardware, methods, and combinations for retaining a lateral suspension link via an integral bracket. Further embodiments, forms, features, aspects, benefits, and advantages of the present application shall become apparent from the description and figures provided herewith.

DETAILED DESCRIPTION OF THE ILLUSTRATIVE EMBODIMENTS

For the purposes of promoting an understanding of the principles of the invention, reference will now be made to the embodiments illustrated in the drawings and specific language will be used to describe the same. It will nevertheless be understood that no limitation of the scope of the invention is thereby intended. Any alterations and further modifications in the described embodiments, and any further applications of the principles of the invention as described herein are contemplated as would normally occur to one skilled in the art to which the invention relates.

Figure 1:
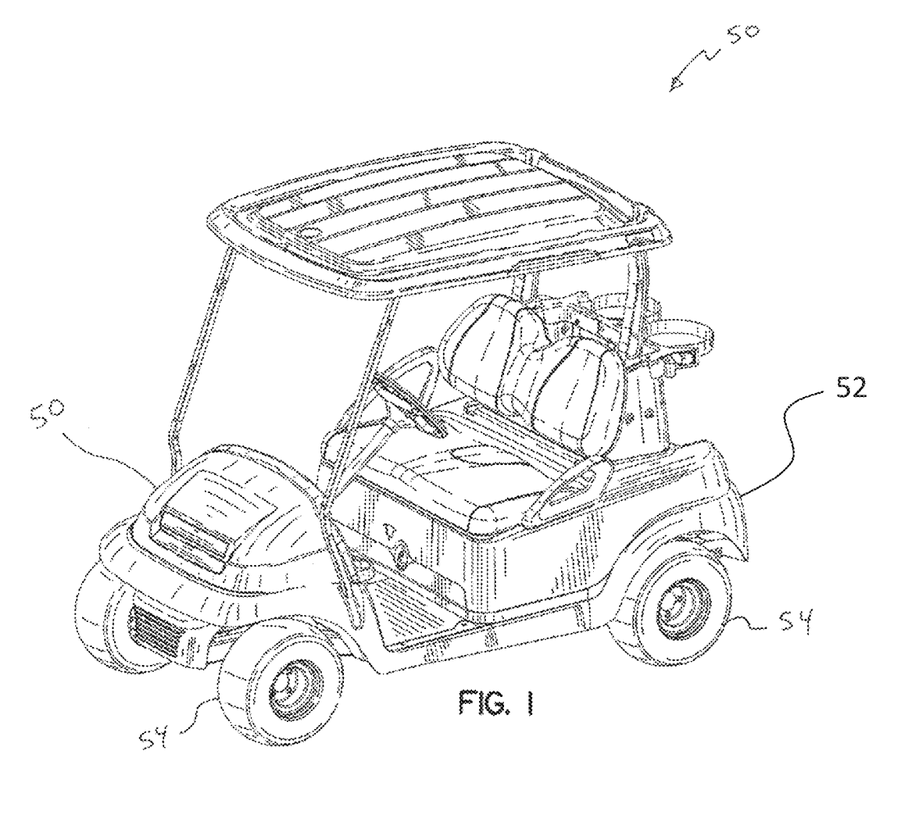
FIG. 1 depicts one embodiment of a utility vehicle.

With reference to FIG. 1, one embodiment of vehicle 50 in the form of a motorized golf cart 50 is shown in which the vehicle includes a frame or chassis upon which a body 52 is secured, as well as a number of wheels 54 which are connected to the frame or chassis through a suspension (discussed further below). The golf cart can be motorized through a variety of mechanisms such as batteries, internal combustion engines, combinations thereof, etc. Although a motorized golf cart is depicted in FIG. 1, in alternative embodiments the vehicle 50 can be a small all-terrain utility vehicle, a neighborhood vehicle, or any other similarly classed light utility passenger vehicles. Accordingly, it will be understood that descriptions found herein that mention "golf cart" are not to be construed as limited but rather can be applied more broadly as set forth above.

Figure 2:
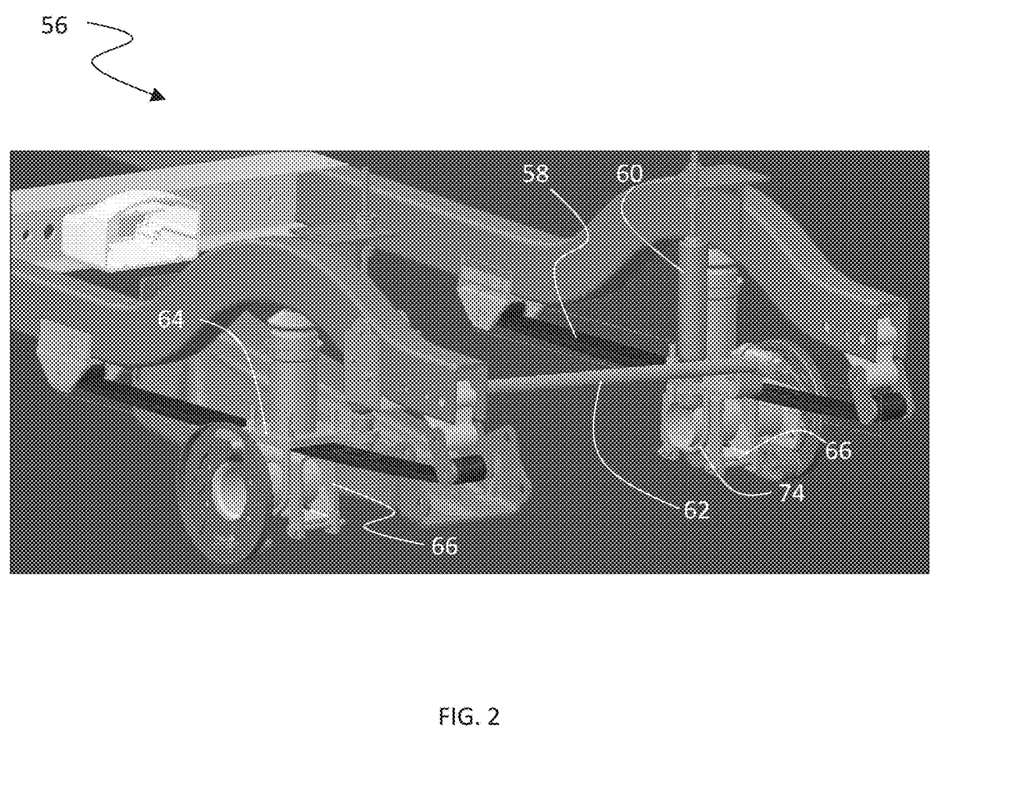
FIG. 2 depict suspension components of the utility vehicle.
Figure 3:
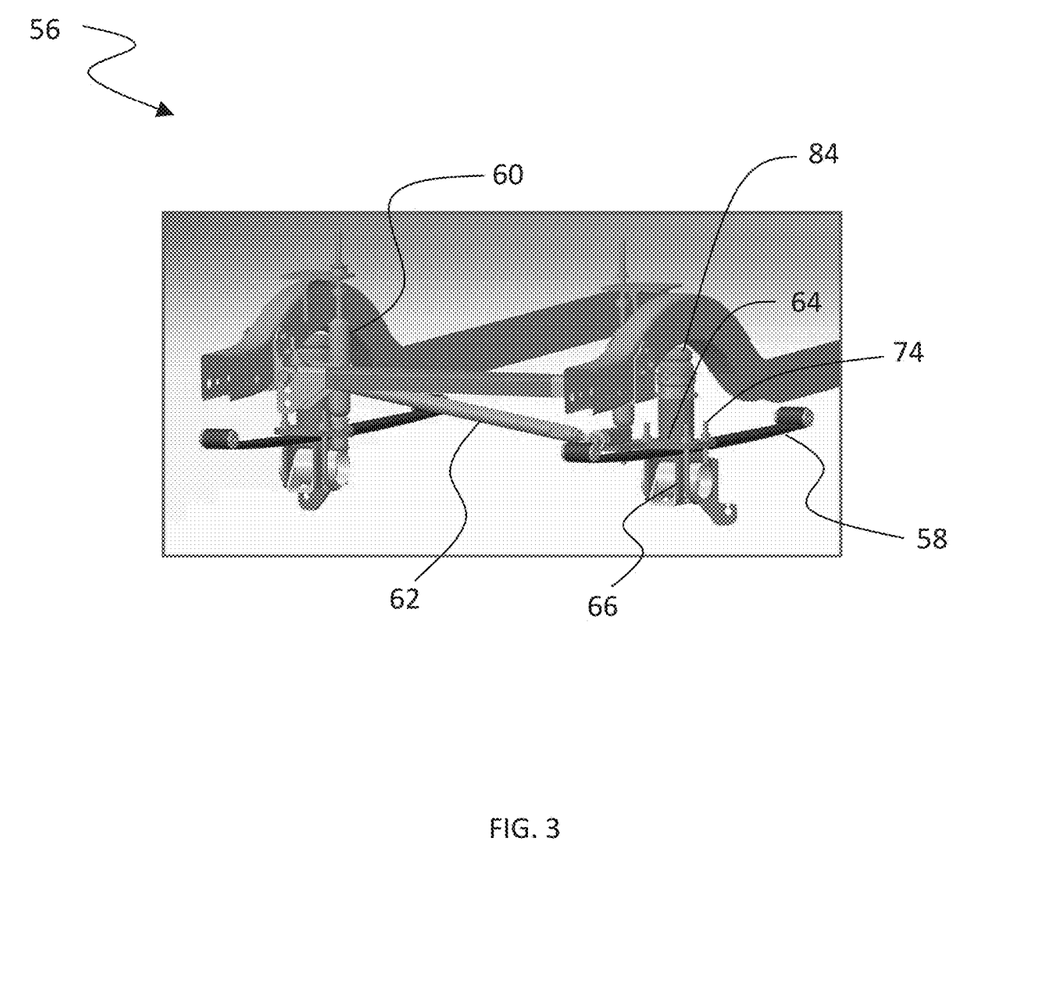
FIG. 3 depict suspension components of the utility vehicle.

Turning now to FIGS. 2 and 3 which provide a view underneath the body 52 at the back end of the vehicle 50, a suspension system 56 is illustrated which includes a spring 58, damper 60, lateral suspension link 62, suspension bracket 64, and perch bracket 66. As will be understood, not shown for sake of clarity is most of the axle that runs between the opposing wheels, although a portion of the axle on both the left and right sides is shown as captured by U-bolts and the suspension bracket 64, further details of which are provided below. The spring 58 can be any suitable spring, such as a leaf spring with any number of leafs. The lateral suspension link 62 can be a Panhard rod, but other link arrangements are also contemplated herein (such as, but not limited to, a Watt's linkage).

Figure 4:
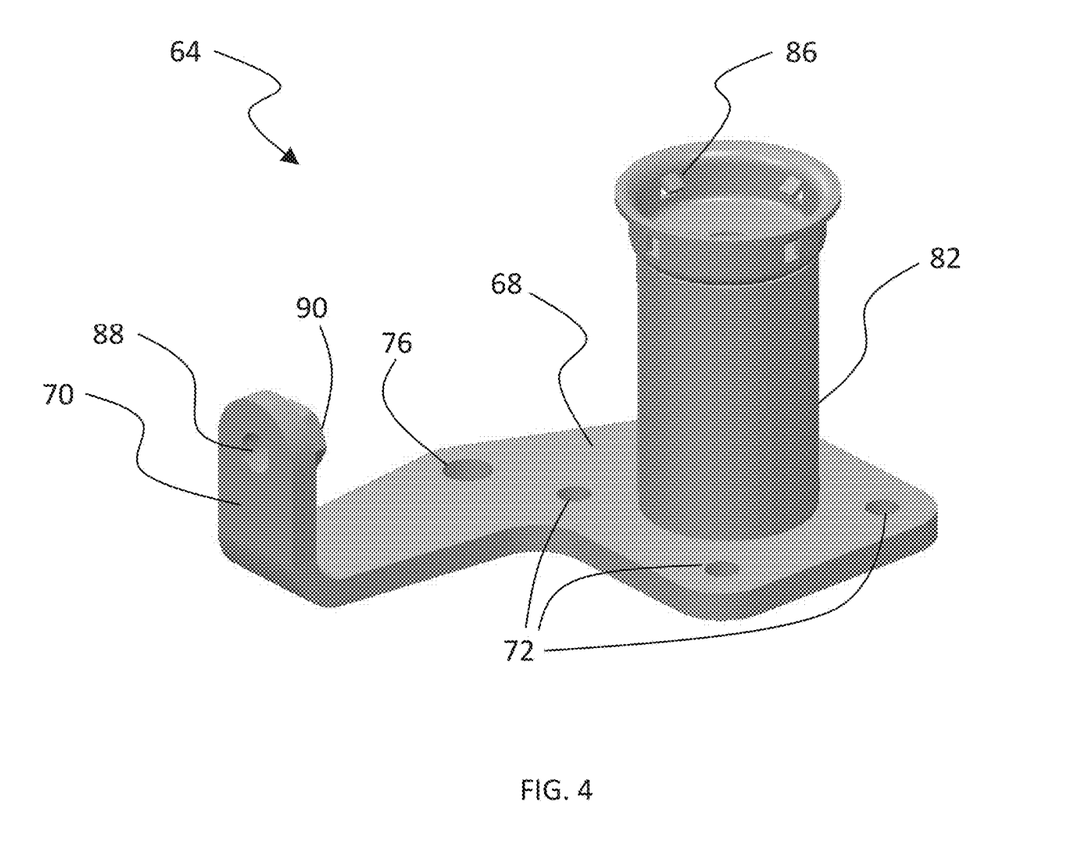
FIG. 4 depict one embodiment of a suspension bracket.
Figure 5A:
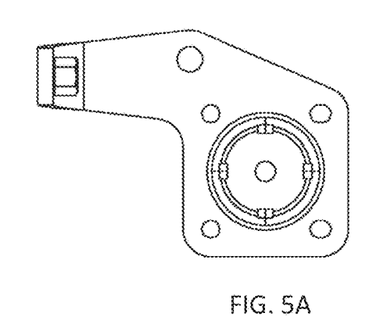
FIGS. 5A-5E depict several views of the suspension bracket in FIG. 4.
Figure 5B:
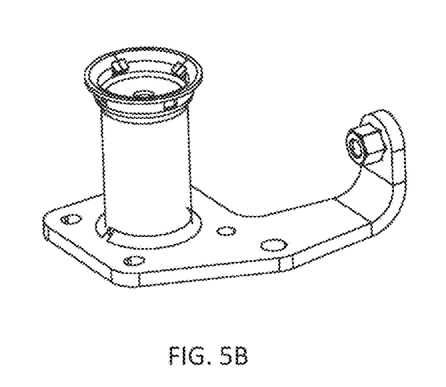
Figure 5C:
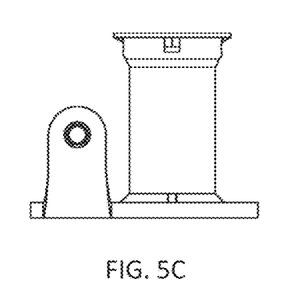
Figure 5D:
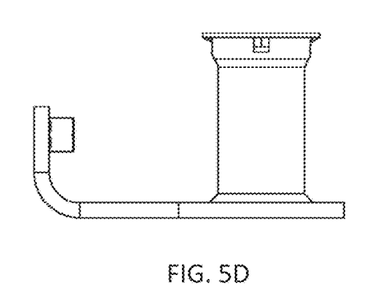
Figure 5E:
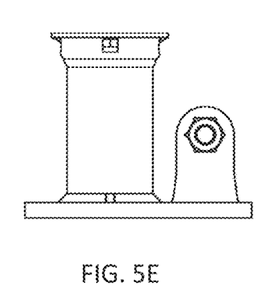
Figure 6:
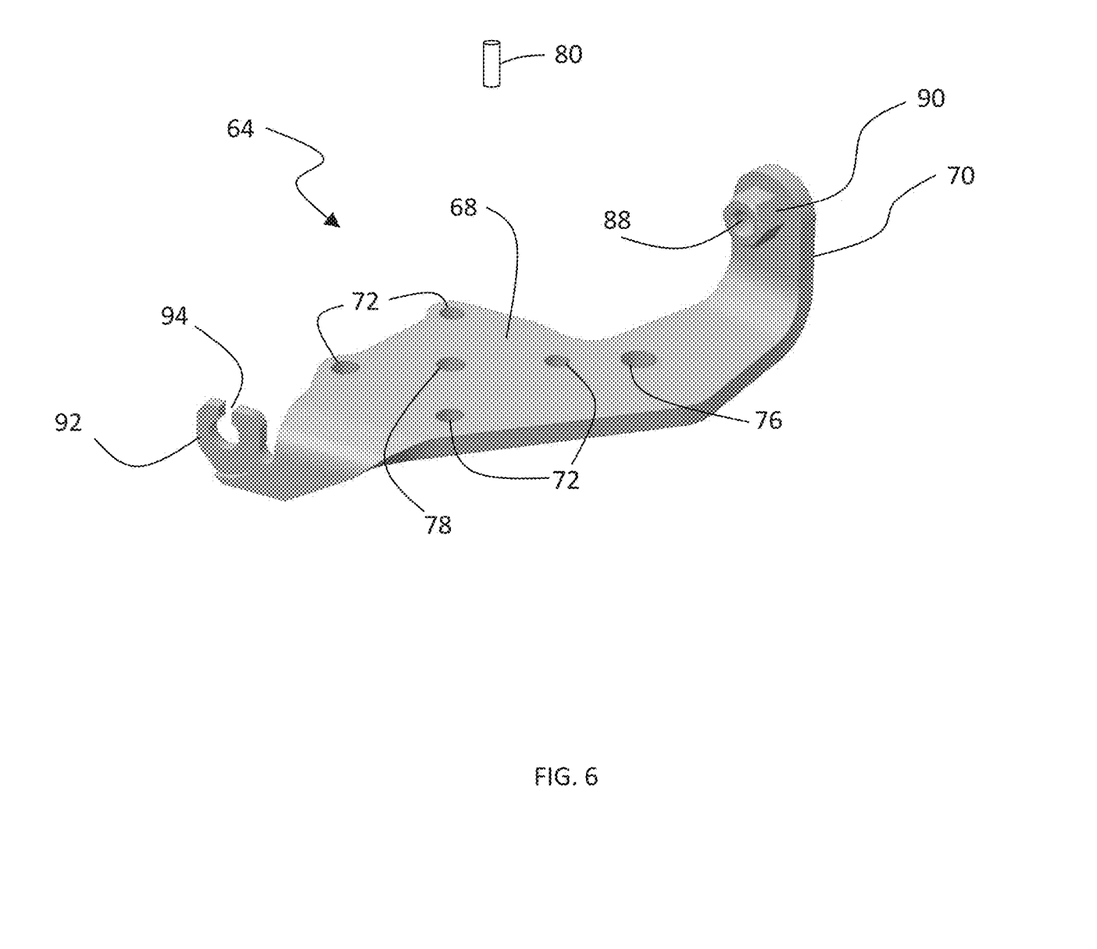
FIG. 6 depict another embodiment of a suspension bracket.

FIGS. 4-5E and FIG. 6-7E illustrate two separate embodiments of the suspension bracket 64 (it will be appreciated that FIGS. 5A-5F include different views of the same bracket, as do FIGS. 7A-7F). The suspension bracket 64 includes in both embodiments a base 68 as well as an upturned flange 70 used to engage the one end of the lateral suspension link 62 (the other end can be attached to a frame member). The suspension bracket 64 includes holes 72 for attachment of U-bolts 74 (shown in FIGS. 2 and 3) to secure the axle to the suspension, and also includes opening 76 for the attachment of the damper 60 to the bracket 64. Also shown in FIG. 6 is an opening 78 for receipt of a spring pin 80 associated with the spring 58. Such a spring pin 80 can be attached to the spring 58 and is used to locate the spring 58 relative to the bracket 64. It will be appreciated that the suspension bracket 64 depicted in FIG. 4 can also include an opening 78 for the spring pin 80 although it may be hidden by a stanchion 82.

The embodiment depicted in FIGS. 4-5E includes the stanchion 82 which can be attached to the base 68 of the suspension bracket 64. The embodiment depicted in FIGS. 6-7F do not show a stanchion 82, but can be fastened with a stanchion 82 if desired in another embodiment in a similar location as that provided in FIGS. 4-5E (e.g. over the opening 78 and intermediate the holes 72). The stanchion 82 can be used to set the limit of frame travel relative to the suspension via action of a jounce bumper 84 (depicted in FIG. 3). The stanchion 82 can be fastened to the bracket 64 using any variety of techniques such as mechanical (e.g. bolts), metallurgical (e.g. welding), and chemical (e.g. bonding) to set forth just a few nonlimiting examples. In one form the stanchion 82 is structured to receive the jounce bumper 84 attached to an end of the stanchion, one embodiment of which can be seen in FIGS. 4-5E. Tangs 86 can be used to secure the jounce bumper 84 to the stanchion 82, but other attachment techniques such as mechanical fastening (e.g. screws), metallurgical fastening (e.g. welding), and chemical fastening (e.g. bonding) can also be used.

The upturned flange 70 includes an opening 88 for attachment use with the lateral suspension link 62. The flange 70 and opening 88 are sized and configured to carry the suspension link loads imposed during operation of the utility cart 50. In one form the upturned flange 70 is arranged at a right angle to the base 68, and can be oriented such that the opening 88 is arranged along a line that is at a right angle to axle/hole 72 arrangement used to secure the axle to the suspension, but other angles than those mentioned here are also contemplated. The opening 88 can be used to receive a bolt or other device useful to secure the lateral suspension link 62 to the bracket 64. The opening 88 can be threaded such as provided through a tapping operation, but other embodiments may simply include a clean through hole or other opening that includes a smooth internal surface. In one form a threaded nut 90 can be attached to the upturned flange 70 through any appropriate technique, such as but not limited to mechanical (e.g. capturing through a mechanical finger arrangement), metallurgical (e.g. welding), and chemical (e.g. bonding).

Figures 7A, 7B, 7C, 7D, 7E, 7F:
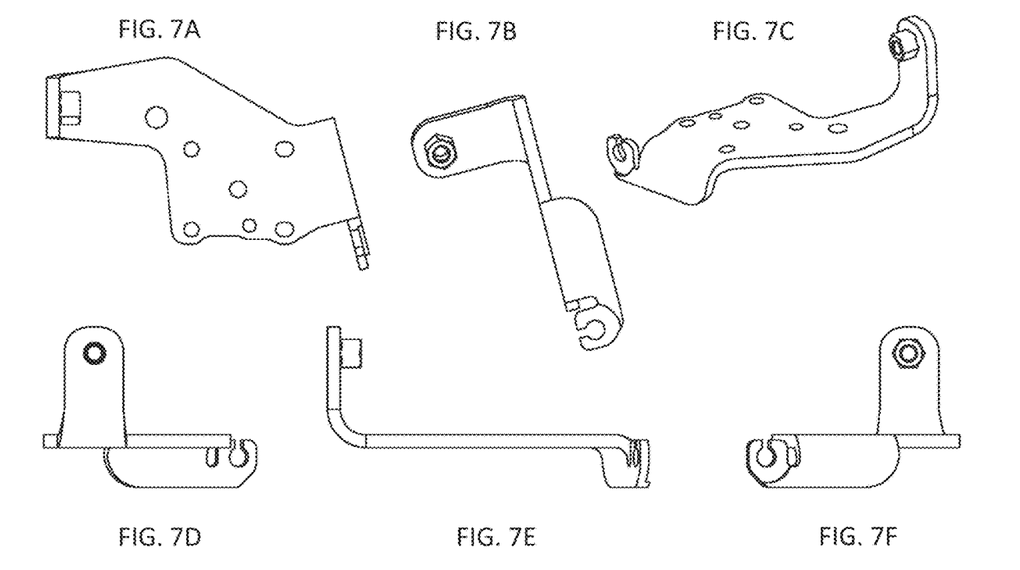
FIG. 7A-7F depict several views of the suspension bracket in FIG. 6.

FIGS. 6-7F illustrate an embodiment of the bracket 64 which includes a brake cable attachment 92 extending from the base 68 and used to capture and/or guide a brake cable. The brake cable attachment 92 can include a slot 94 useful to permit the brake cable (or a part therefore) or an attachment feature of the brake cable to pass through for purposes of securing and/or guiding the brake cable. The slot can provide a friction fit through which the brake cable (or a part therefore) is pressed into and a coupler is snapped into place to complete the assembly. The brake cable attachment 92 can be formed as a flange or other extension from the base and can be arranged at any suitable angle. In the illustrated embodiment the attachment 92 is downturned from the base 68 but with the slot formed on a top of the attachment 92 such as that shown in the illustrated embodiment.

Figure 8:
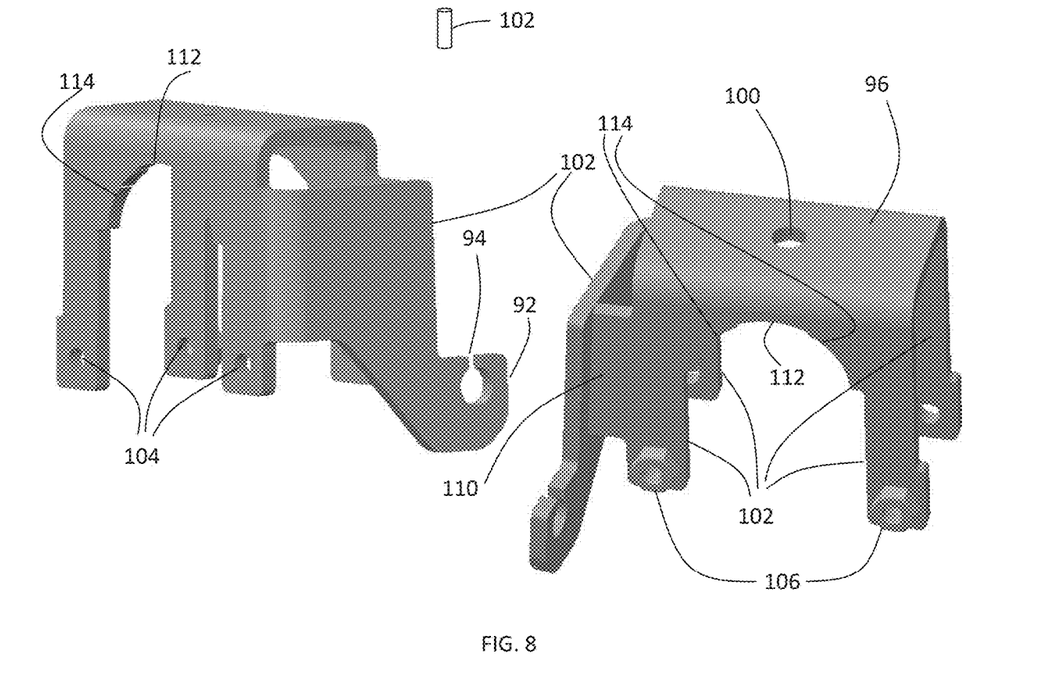
FIG. 8 depict an embodiment of a perch bracket.
Figure 9A:
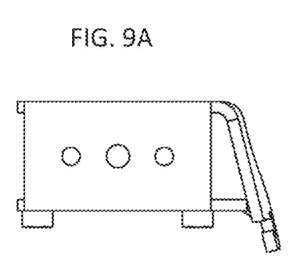
FIGS. 9A-9F depict several views of the suspension bracket in FIG. 8.
Figure 9B:
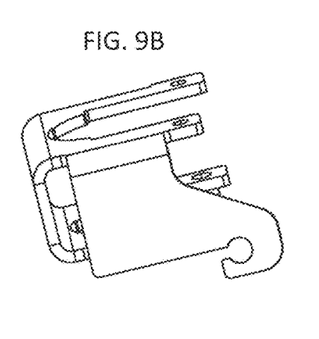
Figure 9C:
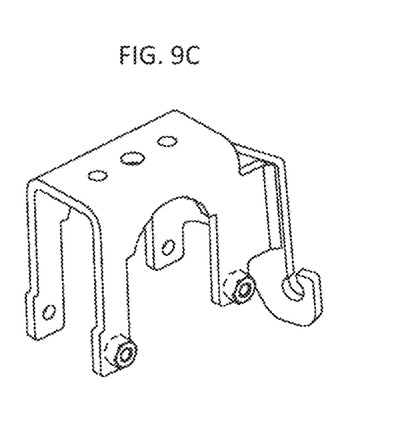
Figure 9D:
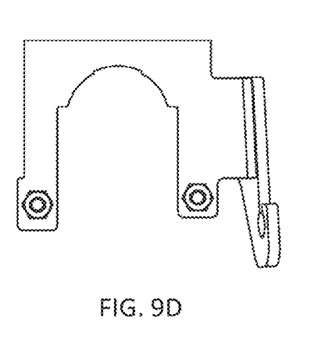
Figure 9E:
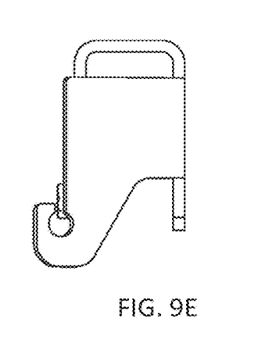
Figure 9F:
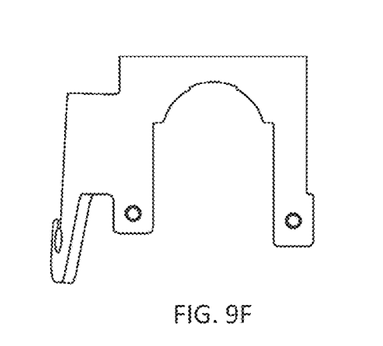

FIGS. 8-9F illustrate an embodiment of the perch bracket 66 (it will be appreciated that FIG. 8 includes different views of the same bracket, as do FIGS. 9A-9F). The perch bracket 66 includes in both embodiments a base 96 as well as downturned legs 98 used to straddle the axle and secure the bracket to the axle as shown above. The perch bracket 66 can also include an opening 100 for receipt of a spring pin 102 associated with the spring 58. Such a spring pin 102 can be attached to the spring 58 and used to locate the spring 58 relative to the bracket 64.

The downturned legs 98 can each include an opening 104 for receipt of a fastener (such as bolt 106 seen in FIG. 2) used to secure the perch bracket 66 to the axle. In some forms the bolt 106 can be inserted through the opening 104 and into a sleeve that extends to the other leg. The downturned legs 98 and openings 104 are sized and configured to carry loads imposed during operation of the utility cart 50. In one form the downturned legs 98 can be oriented such that the opening 104 are arranged along a line that is coaxial with the axle to the suspension, but other angles than those mentioned here are also contemplated. The openings 104 can be used to receive a bolt or other device useful to secure the perch bracket 66 to the axle. One or more of the openings 104 can be threaded such as provided through a tapping operation, but other embodiments may simply include a clean through hole or other opening that includes a smooth internal surface. In one form one or more of the legs 98 can include a threaded nut 106 that is attached through any appropriate technique, such as but not limited to mechanical (e.g. capturing through a mechanical finger arrangement), metallurgical (e.g. welding), and chemical (e.g. bonding). In one embodiment (illustrated in the figure), two of the attachment legs can include a threaded nut attached to the legs.

The perch bracket 66 includes a cutout 112 located between arc segments 114. The arc segments 114 are used to support the axle when installed in the utility cart 50. In one form the cutout 112 is a 2 mm relief formed relative to the arc segments 114 such that the axle will rest upon the arc segments 114 but in some forms will avoid touching the bracket along at least some portion of the thickness of the cutout formation 112.

FIGS. 8-9F illustrate an embodiment of the bracket 66 which includes a brake cable attachment 92 extending from an end 108 and used to capture and/or guide a brake cable. The brake cable attachment 92 can include a slot 94 useful to permit the brake cable (or a part therefore) or an attachment feature of the brake cable to pass through for purposes of securing and/or guiding the brake cable. The slot can provide a friction fit through which the brake cable (or a part therefore) is pressed into and a coupler is snapped into place to complete the assembly. The brake cable attachment 92 can be formed as a flange or other extension from an end of the perch bracket 66 and can be arranged at any suitable angle. The attachment 92 can extend further away from an end of the perch bracket 66, but other orientations are also contemplated.

The perch bracket 66 can include the end 108 extending from one of the legs 98 and is folded over toward a flange 110 extending from an opposing leg 98. The flange 110 acts as an offset from its associated leg 98 such that when the end 108 is folded toward and contacts the flange 110, the end can be oriented at a non-orthogonal angle.

Although both bracket 64 and 66 include embodiments which have a cable attachment feature, either or both of the brackets 64 and 66 can include the cable attachment features discussed above.

As will be appreciated, the brackets 64 and 66 are configured to sandwich and thereby capture the spring 58 therebetween. A spring pin 80 and 102 on one or both sides of the spring 58 can be inserted into the respective spring pin openings in the brackets 64 and/or 66. It will be appreciated that the opposite side of the bracket 64 from the base 68 can match the shape of the spring 58, such as but not limited to a planar shape. Likewise, it will be appreciated that the base 96 of the perch bracket 66 can match the shape of the spring 58, such as but not limited to a planar shape.

As will be appreciated, a number of further variations in the brackets are contemplated herein. For example, one or more of the holes/openings 72, 76, 78, 88, and 100 can be optional in any given embodiment, and/or are optionally added at a later time in a manufacturing step of the brackets 64 and 66. Additionally and/or alternatively, it will be appreciated that the brackets 66 and 68 are illustrated for use on one side of the particular vehicle 50 configuration depicted in the figures, but it will be readily understood that other embodiments can be re-cast such that they are useful for the other side of the vehicle 50 as well. To set forth just one non-limiting example, the location and orientation of the flange can be adjusted to accommodate use on the other side of the particular vehicle 50 configuration depicted in the figures.

Either or both of the brackets 64 and 66 can be made using a number of different manufacturing processes and any number of steps, and in one form includes operations such as cutting a shape from a stock material, and/or stamping material to final form or near final form. Such manufacturing can result in an integral bracket 64 and/or 66 part that can be handled and transported as a single unit. The integral part can be readily installed into a golf cart or other utility cart by simple handling of a single part 64 and/or 66 in lieu of complex fastening/bonding/etc of multiple parts as part of the installation process. Such a part could be considered a homogenous integral whole in some embodiments. In some forms the integral part is a monolithic component such as can be formed through a cutting and/or stamping process.

In those embodiments which are stamped at least in part of its manufacturing, it will be understood that the integral component will include one or more regions of material that are locally yielded, such as in regions that include folds. The integral component may include material located between or adjacent to locally yielded regions that have not been yielded such as through a stamping process. It will be understood that folded material that results in locally yielded material regions will typically be performed at relatively cool temperatures unlike those high temperatures where a material may have been yielded such as through a forging process. Inspection of the integral component will be able to differentiate material that has not been 'yielded' as a result of a stamping operation and those that have been 'yielded' as a result of any possible other operation such as forging.

In one form the integral component (whether bracket 64 or 6) can be formed from a piece of sheet stock material, such as sheet steel, that is first cut to shape, then stamped in one or more stamping operations into a final or near final form. The cutting can be via any number of useful techniques, such as laser cutting, die cut, etc. Stamping can form the upturned flange 70 and legs 98, the brake feature 92 on the bracket 64, and the end 108 folded toward the flange 110, among other features. In one form of the perch bracket 66, the legs 98 are formed in a first stamping operation, and the end 108 folded toward the flange 110 formed in a second operation. In some forms any of the holes/openings 72, 76, 78, 88, and 100 can be formed in a contemporaneous cutting operation as the intermediate shaped material cut from sheet stock, but any of the holes/openings can additionally and/or alternatively be formed during the stamping procedure. To set forth just a few nonlimiting examples, the holes 72 for the U-bolts can be formed during the cutting step (e.g. die cutting, laser cutting, etc), but can be formed at other points in the manufacturing process. In one embodiment the holes 72 can be formed after the initial cutting and during subsequent stamping. In still other additional and/or alternative embodiments the holes 72 can be formed in a drilling operation at any point in time, such as the sheet metal stock stage, cutting stage, or stamping stage. In general, the order of operation can vary, and includes any of the following: cut, stamp, and drill hole (or form using any appropriate technique). Still other embodiments are contemplated herein.

One aspect of the present application includes an apparatus comprising a utility cart suspension bracket having a material composition and thickness to carry suspension loads of a utility cart, the suspension bracket including a plurality of U-bolt through holes in which a U-bolt can be inserted, the U-bolt through holes sized to secure the suspension bracket to an axle of the utility cart, the suspension bracket also including a center pin aperture into which a spring pin can be inserted as well as an upturned lateral suspension link attachment flange having a structural configuration sufficient to withstand lateral suspension link loads of the utility cart.

One feature of the present application includes wherein the bracket is formed from a stamping operation such that the bracket includes locally yielded material regions in the corner portion of the upturned lateral suspension link attachment flange.

Another feature of the present application includes wherein the upturned lateral suspension link attachment flange is an upturned Panhard rod attachment flange, and wherein the suspension bracket is coupled with a perch bracket further having a semicircular axle locating feature into which an axle can be inserted.

Still another feature of the present application includes wherein the bracket further includes a brake cable attachment aperture.

Yet another feature of the present application includes wherein the bracket further includes a hole for insertion of a shock attachment, the bracket sized around the hole to support loads imparted from the shock.

Still yet another feature of the present application further includes a stanchion configured to support a jounce bumper.

Yet still another feature of the present application further includes the utility cart having the axle, the utility car further including a spring having the spring pin as well as a perch bracket including a center pin aperture into which a spring pin can be inserted as well as a plurality of attachment legs extending away from the center pin aperture and structured to straddle an axle of the utility cart.

A further feature of the present application includes wherein the upturned lateral suspension link attachment flange is an upturned Panhard rod attachment flange, and which further includes a Panhard rod, and wherein the spring is a leaf spring.

Another aspect of the present application provides an apparatus comprising a vehicle suspension bracket structured to secure suspension components within the vehicle suspension, the vehicle suspension bracket having: a base having a flattened first side structured for engagement with a leaf spring and a second side structured to support a stanchion and jounce bumper, a plurality of U-bolt holes formed in the base and configured to structurally support loads from a U-bolt connection, and a lateral suspension link connection point coupled with the base, the lateral suspension link connection point configured to support attachment of a lateral suspension link.

A feature of the present application includes wherein the lateral suspension link connection point is structured to support attachment of an end of the lateral suspension link.

Another feature of the present application includes wherein the suspension bracket is structured for use with utility carts, and wherein the suspension bracket is coupled with a perch bracket having a first pair of legs that extend from a base and which are laterally spaced from a second pair of legs extending from the base.

Still another feature of the present application further includes a brake attachment flange having a slot formed therein for insertion of a brake cable.

Yet still another feature of the present application further includes a stanchion extending from the base, the stanchion configured to include a jounce bumper.

Still yet another feature of the present application includes wherein the lateral suspension link connection point is a formed as flange upturned from the base, and wherein the bracket includes locally yielded material in the corner of the upturned flange.

A further feature of the present application includes wherein the lateral suspension link connection point is a Panhard rod connection point, and wherein the suspension bracket is coupled with a perch bracket for a vehicle suspension structured to secure suspension components within the vehicle suspension, the vehicle perch bracket having a base having a flattened first side structured for engagement with a leaf spring, the base also including an aperture into which a pin of a leaf spring is inserted, a first pair of legs extending from the base and which are laterally spaced from a second pair of legs extending from the base.

Still another aspect of the present application provides a method comprising providing a sheet stock blank having an area intended to be formed into a base for a lateral suspension link bracket, cutting an intermediate shaped lateral suspension link bracket from the sheet stock blank, forming U-bolt holes in the base, and stamping the intermediate shaped lateral suspension link bracket to form a lateral suspension link bracket having the base and an upturned lateral suspension link attachment flange.

A feature of the present application includes wherein the cutting is performed using one of laser cutting and die cutting.

Another feature of the present application includes wherein the forming occurs prior to the stamping.

Still another feature of the present application further includes forming a spring pin aperture in the base sufficient to locate and support a pin associated with a leaf spring of a vehicle suspension.

Yet another feature of the present application further includes forming a hole into which a fastener for the lateral suspension link can be inserted.

Still yet another feature of the present application further includes affixing a threaded nut to the upturned flange.

Yet still another feature of the present application includes wherein the stamping includes forming a brake attachment flange having a cutout opening to insert a brake cable.

While the invention has been illustrated and described in detail in the drawings and foregoing description, the same is to be considered as illustrative and not restrictive in character, it being understood that only the preferred embodiments have been shown and described and that all changes and modifications that come within the spirit of the inventions are desired to be protected. It should be understood that while the use of words such as preferable, preferably, preferred or more preferred utilized in the description above indicate that the feature so described may be more desirable, it nonetheless may not be necessary and embodiments lacking the same may be contemplated as within the scope of the invention, the scope being defined by the claims that follow. In reading the claims, it is intended that when words such as "a," "an," "at least one," or "at least one portion" are used there is no intention to limit the claim to only one item unless specifically stated to the contrary in the claim. When the language "at least a portion" and/or "a portion" is used the item can include a portion and/or the entire item unless specifically stated to the contrary. Unless specified or limited otherwise, the terms "mounted," "connected," "supported," and "coupled" and variations thereof are used broadly and encompass both direct and indirect mountings, connections, supports, and couplings. Further, "connected" and "coupled" are not restricted to physical or mechanical connections or couplings.

What is claimed is:

1. An apparatus comprising:
a utility cart suspension bracket having a material composition and thickness to carry suspension loads of a utility cart, the suspension bracket including a plurality of U-bolt through holes in which a U-bolt can be inserted, the U-bolt through holes sized to secure the suspension bracket to an axle of the utility cart, the suspension bracket also including a center pin aperture into which a spring pin can be inserted as well as an upturned lateral suspension link attachment flange having a structural configuration sufficient to withstand lateral suspension link loads of the utility cart.

2. The apparatus of claim 1, wherein the bracket is formed from a stamping operation such that the bracket includes locally yielded material regions in the corner portion of the upturned lateral suspension link attachment flange.

3. The apparatus of claim 2, wherein the upturned lateral suspension link attachment flange is an upturned Panhard rod attachment flange, and wherein the suspension bracket is coupled with a perch bracket further having a semicircular axle locating feature into which an axle can be inserted.

4. The apparatus of claim 2, wherein the bracket further includes a brake cable attachment aperture.

5. The apparatus of claim 2, wherein the bracket further includes a hole for insertion of a shock attachment, the bracket sized around the hole to support loads imparted from the shock.

6. The apparatus of claim 5, which further includes a stanchion configured to support a jounce bumper.

7. The apparatus of claim 6, which further includes the utility cart having the axle, the utility car further including a spring having the spring pin as well as a perch bracket including a center pin aperture into which a spring pin can be inserted as well as a plurality of attachment legs extending away from the center pin aperture and structured to straddle an axle of the utility cart.

8. The apparatus of claim 7, wherein the upturned lateral suspension link attachment flange is an upturned Panhard rod attachment flange, and which further includes a Panhard rod, and wherein the spring is a leaf spring.

9. An apparatus comprising:
a vehicle suspension bracket structured to secure suspension components within the vehicle suspension, the vehicle suspension bracket having:
a base having a flattened first side structured for engagement with a leaf spring and a second side structured to support a stanchion and jounce bumper;
a plurality of U-bolt holes formed in the base and configured to structurally support loads from a U-bolt connection; and
a lateral suspension link connection point coupled with the base, the lateral suspension link connection point configured to support attachment of a lateral suspension link.

10. The apparatus of claim 9, wherein the lateral suspension link connection point is structured to support attachment of an end of the lateral suspension link.

11. The apparatus of claim 10, wherein the suspension bracket is structured for use with utility carts, and wherein the suspension bracket is coupled with a perch bracket having a first pair of legs that extend from a base and which are laterally spaced from a second pair of legs extending from the base.

12. The apparatus of claim 10, which further includes a brake attachment flange having a slot formed therein for insertion of a brake cable.

13. The apparatus of claim 10, which further includes a stanchion extending from the base, the stanchion configured to include a jounce bumper.

14. The apparatus of claim 10, wherein the lateral suspension link connection point is a formed as flange upturned from the base, and wherein the bracket includes locally yielded material in the corner of the upturned flange.

15. The apparatus of claim 14, wherein the lateral suspension link connection point is a Panhard rod connection point, and wherein the suspension bracket is coupled with a perch bracket for a vehicle suspension structured to secure suspension components within the vehicle suspension, the vehicle perch bracket having a base having a flattened first side structured for engagement with a leaf spring, the base also including an aperture into which a pin of a leaf spring is inserted, a first pair of legs extending from the base and which are laterally spaced from a second pair of legs extending from the base.

\* \* \* \* \*